W. A. DORAIS AND J. B. FEISE.
INDICATOR.
APPLICATION FILED MAR. 19, 1915.
1,305,255.
Patented June 3, 1919.
2 SHEETS—SHEET 1.
FIG. 1
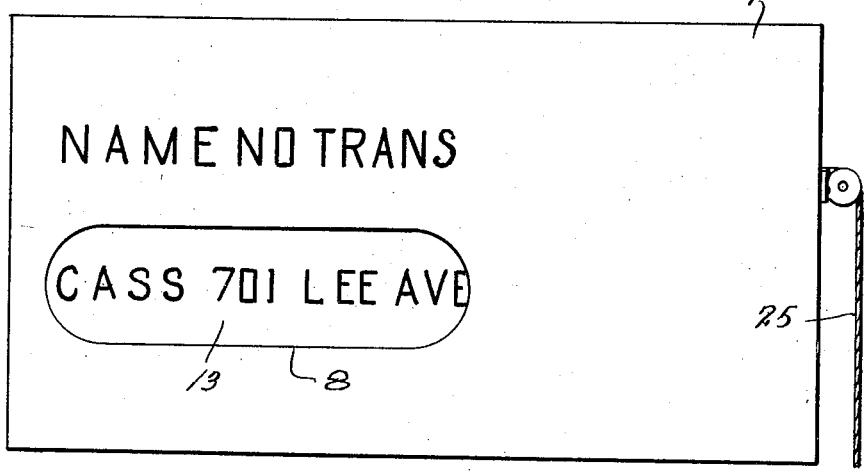
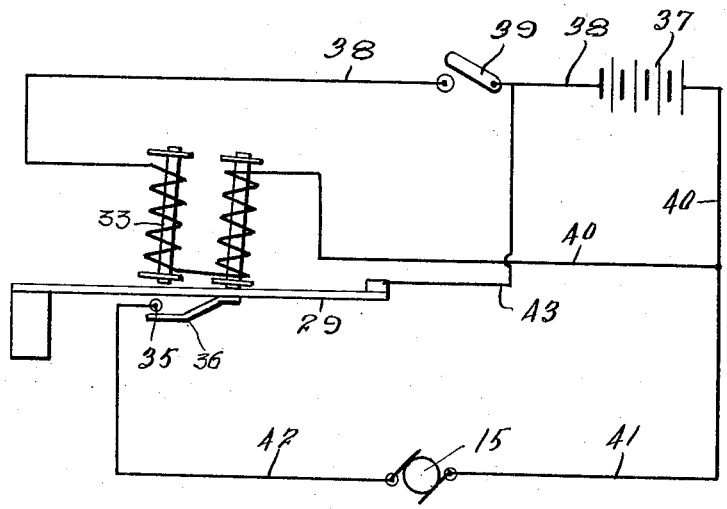
FIG. 5
Inventors
W. A. Dorais
& J. B. Feise
Witnesses
Chas. H. Trotter
Chas Seebold
By
Attorney W. A. DORAIS AND J. B. FEISE.
INDICATOR.
APPLICATION FILED MAR. 19, 1915.
1,305,255.
Patented June 3, 1919.
2 SHEETS—SHEET 2.
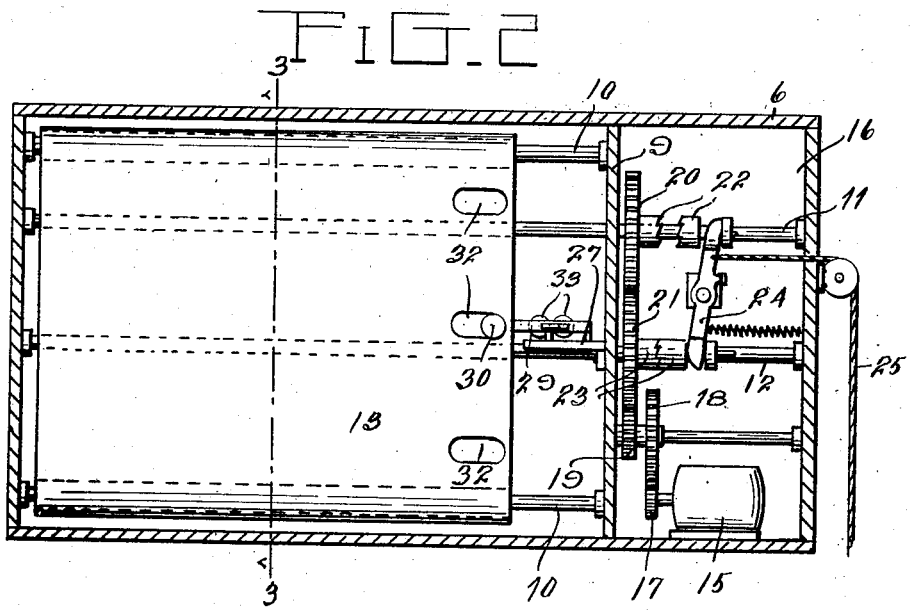
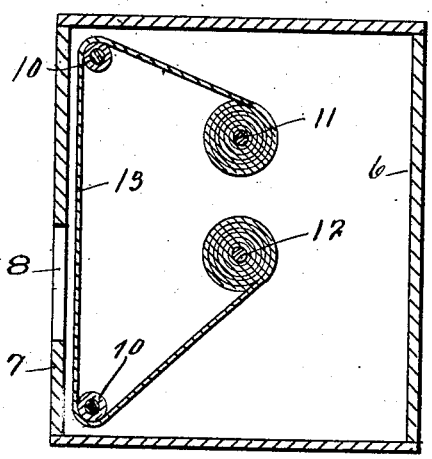
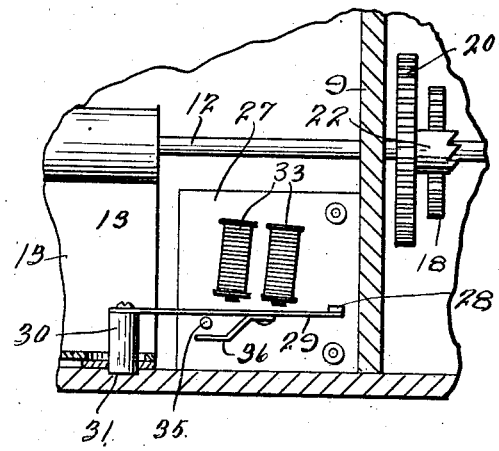
Witnesses
Chas. H. Trotter.
Inventors
W. A. Dorais
& J. B. Feise
By
Attorney

UNITED STATES PATENT OFFICE.

WILLIAM A. DORAIS AND JOSEPH B. FEISE, OF O'FALLON, MISSOURI.

INDICATOR.

1,305,255.     Specification of Letters Patent.      Patented June 3, 1919.

Application filed March 19, 1915. Serial No. 15,511.

*To all whom it may concern:*

Be it known that we, WILLIAM A. DORAIS and JOSEPH B. FEISE, citizens of the United States, residing at O'Fallon, in the county of St. Charles and State of Missouri, have invented certain new and useful Improvements in Indicators; and we do hereby declare the following to be a full, clear, and exact description of the invention, such as will enable others skilled in the art to which it appertains to make and use the same.

This invention relates to indicators especially designed for use in railway trains and stations for indicating stations, streets, time of departure and number of trains and the like.

The invention has for its principal object to provide an indicator of improved and simplified construction embodying efficient means for insuring proper registration of the markings upon the indicator cloth with the opening in the indicator casing.

Another object is the provision of novel means for quickly and conveniently reversing the direction of travel of the indicator cloth.

Another object is the provision of means for automatically closing the circuit to an electrical operating means for the indicator cloth controlled by the stop mechanism for the cloth.

With these and other objects in view, the invention consists in the novel construction, arrangement and formation of parts as will be hereinafter specifically described, claimed and illustrated in the accompanying drawing, in which:

Figure 1 represents a front elevation of the indicator.

Fig. 2 represents a longitudinal sectional view through the indicator casing.

Fig. 3 represents a transverse sectional view on the line 3—3 of Fig. 2.

Fig. 4 represents an enlarged detail sectional view through the indicator, illustrating the electrically operated stop mechanism in detail.

Fig. 5 represents a diagrammatical view of the electrical circuit for controlling the operating mechanism for the indicator.

Referring to the drawing in detail, wherein similar reference numerals designate corresponding parts throughout the several views, the numeral 6 indicates generally the casing of the indicator which is preferably of rectilinear formation and includes a front wall 7 having an aperture 8 therein covered by a section of transparent material through which the markings upon the indicator cloth are visible. A partition 9 is arranged adjacent one end of the casing 6 and provides a support for the adjacent ends of a pair of guide rollers 10, the opposite ends of which are rotatably mounted in the opposite end wall of the casing. A pair of horizontally disposed shafts 11 and 12 are positioned through the partition 8 and rotatably supported in suitable bearings secured to the inner surfaces of the end walls of the casing. The opposite ends of an indicator cloth 13 are secured to the upper and lower shafts 11 and 12, respectively, and the intermediate portion of the cloth is trained over the guide shafts 10.

An electric motor 15 is arranged in the chamber 16 between the partition 9 and the adjacent end wall of the casing and the shaft thereof is provided with a gear wheel 17 meshing with an idler gear wheel 18 with which is connected a third wheel 19. Intermeshing gear wheels 20 and 21 are rotatably mounted upon the shafts 11 and 12, respectively, the gear wheel 21 being in mesh with the relatively small gear wheel 19.

The gear wheel 20 is adapted to be keyed for rotation with the shaft 11 by a pair of clutch members 22, and the gear wheel 21 is adapted to be keyed to the shaft 12 by a pair of clutch members 23. A clutch lever 24 is pivotally supported in the chamber 16 and is engaged at its opposite ends with the relatively movable members of the clutches 22 and 23 and is adapted to be rocked upon its pivotal axis by a cord or equivalent means 25 to alternately key the gear wheels 20 and 21 upon their respective shafts 11 and 12.

A support 27 is suitably secured to the rear surface of the front wall 7 of the casing and carries a post 28 to which is secured one end of a spring 29 extending inwardly behind the forward portion of the indicator cloth 13 between the guide shafts 10. An arm or stop member 30 is secured laterally of the free end of the spring 29 and is normally retained within a recess 31 formed in the front wall 7 by the tension of the spring. The indicator cloth 13 is formed along one of its longitudinal edges with a plurality of spaced apertures 32 in which the stop member 30 is adapted to engage. The spring 29 constitutes an armature for a pair of electro-magnets 33 secured upon the support 27 and adapted, when energized, to draw the spring 29 inwardly and withdraw the stop member 30 from the recess 31 and aperture 32 in the indicator cloth 31 and thus release the latter. A relatively stationary contact 35 is secured to the support 27 and is adapted to be engaged by the spring contact 36 secured to the spring 29 when the latter is moved rearwardly under the magnetic influence of the magnets 33.

A suitable source of electro-motive force, such as a battery 37, is provided for operating the electric motor 15 and the electro-magnets 33, and one pole of the battery is connected with the electro-magnets 33 by a conductor 38 in which is arranged a switch 39 whereby the circuit to the magnets may be broken when desired. The opposite pole of the battery 37 is connected with the electro-magnets 33 by a conductor 40, and it is clearly apparent, that when the circuit to the electro-magnets is closed by properly adjusting the switch 39 the spring 29 will be attracted and moved rearwardly, thus disengaging the stop member 30 from within the apertures 32 in the indicator cloth 13. The motor 15 is connected with the conductor 40 by a branch conductor 41 and also with the relatively stationary contact 35 by a conductor 42. The spring 29 is connected with the other battery wire 38 by a branch conductor 43, and thus, when the spring 29 is moved rearwardly under the magnetic influence of the electro-magnets 33 the contact 36 is moved into engagement with the contact 35 and the circuit to the motor 15 is completed through the conductors 38, branch conductor 43, spring 29, contacts 36 and 35, conductor 42, motor 15, branch conductor 41 and conductor 40. The rotational movement of the shaft of the motor 15 is transmitted to either of the shafts 11 or 12 through the train of gears and the indicator cloth is thus caused to travel behind the aperture 8 in the indicator casing. When the next aperture 32 in the indicator cloth 13 moves into registration with the recess 31 in the front wall 7, the stop member 30 is moved forwardly under the influence of the spring 29 and thus stops the movement of the indicator cloth and simultaneously breaks the motor circuit by disengaging the movable contact 36 from the relatively stationary contact 35.

What we claim is:

An indicator comprising, a casing; a pair of parallel shafts mounted within the casing; permanently meshing gear wheels rotatably mounted on said shafts; an indicator cloth arranged on said shafts; means permanently connected with one of said gear wheels for winding said indicator cloth on said shaft; clutch elements arranged on said shafts and having connections with said gears; a lever having connection with said clutch elements; a coil spring connected with said lever and adapted for normally retaining one of said clutch elements in an inoperative position; and means for throwing the other clutch element in an operative position.

In testimony whereof we affix our signatures in presence of two witnesses.

WILLIAM A. DORAIS.
JOSEPH B. FEISE.

Witnesses:
JOHN GENTEMAN,
SEBASTIAN J. SALFUR.

Copies of this patent may be obtained for five cents each, by addressing the "Commissioner of Patents, Washington, D. C."